Patented Nov. 5, 1940

2,220,750

UNITED STATES PATENT OFFICE 2,220,750

MANUFACTURE OF SILICEOUS BODIES

George J. Bair, Pittsburgh, and Robert A. Miller, Tarentum, Pa., assignors to Norbert S. Garbisch No Drawing. Application March 29, 1938, Serial No. 198,701

7 Claims. (Cl. 49—77)

The present invention relates to the manufacture of coherent masses from finely divided siliceous materials and it has particular relation to the manufacture of bodies of the foregoing type for use in the formulation of glass.

One object of the invention is to provide an intimate coherent, compact, dust free, intimate mixture of silica and fluxing agents having good heat conductivity and which upon application of heat, melts at a relatively low temperature to provide a highly uniform body of glass.

A second object of the invention is to provide a process by use of which the waste material from the grinding and polishing of glass can be converted into a highly valuable product.

A third object of the invention is to provide a process of the foregoing type in which the free water in the coherent masses is reduced to a minimum or entirely eliminated without evaporation.

These and other objects of the invention will be apparent from consideration of the following specification and appended claims.

In the formation of glass by conventional methods, a dry mixture of coarse sand, fluxes such as soda ash and lime and enough of glass (about 20 or 25%) as cullet to give desired melting properties to the mixture, is heated in pots or tanks to melt it down to fluid state. The molten material is then drawn, cast, or otherwise formed into sheets or similar bodies which may be smoothed by grinding and polishing. In the grinding and polishing of sheet glass, ordinary silica or sand in water suspension or slurry is employed as an abrasive agent, and is held in contact with the surface by means of revolving cast iron discs known as runners. The surface of the glass is gradually worn away to a relatively uniform plane and likewise iron is worn or ground from the runners. Simultaneously the particles of sand are gradually broken up into finer and finer states of subdivision. From time to time the partially broken down sand is subjected to classification by convenient apparatus in order to separate the coarser particles from the finer. The coarse material is returned to the grinding operation and the finer material is used for making the finishing cuts upon the surface of the glass. Ultimately the sand becomes so broken up that the particles are no longer satisfactory for use as an abrasive.

Various objectionable features characterize such processes. For example, prior to or during the melting of the batch the dry batch materials tend to segregate to produce irregularities in the composition of the batch. Storage of the mixed materials is therefore impractical and all reserve supplies of various batch material must be kept in separate bins. Moreover, when the mixed materials are introduced into molten glass in a tank, the lighter ones may tend to float out from the heavier ones. Accordingly, melting of the batch occurs over a very broad range of temperatures and the composition of the resultant glass is so variable that stratification and other undesirable effects may occur. Moreover, the highly uniform mixture of finely crushed or broken sand, gloss debris, iron, gypsum, etc., from the polishing operation has, heretofore, been discarded, either by running it into a stream where it constitutes a source of pollution or by running it out upon dumps. In the latter case in course of time enormous quantities are accumulated and it becomes a serious nuisance about the plant.

It has heretofore been suggested that this waste sand be purified by removal of the iron content thereof by magnetic separators and by treatment with hydrochloric acid or sulphuric acid. As a result of such treatment there is obtained a relatively iron free mixture of extremely finely divided silica and glass in highly uniform admixture with each other. This mixture is of a composition excellently suited for use in the manufacture of additional glass, and it has been suggested that it be admixed with lime and soda ash in suitable proportions and returned to the glass batch. However, it is in such fine state of subdivision that considerable difficulty is encountered in obtaining satisfactory heat conduction therethrough in the pots or tanks employed in the manufacture of glass. Furthermore, the finely divided material is of a dusty nature and loss thereof through the flues of the tanks is likely to occur.

According to the provisions of the present invention the foregoing difficulties are substantially obviated by careful incorporation of recovered grinding sand with fluxing agents, such as sodium carbonate, salt cake, lime and the like, and water to form a pasty mass. If the ratio of water is properly chosen, this mass can be mulled to form nodules, or can be formed into briquettes by suitable methods. These briquettes can then be dried to coherent state eminently suited for use in the formation of glass.

In the practice of the invention it is preferable to draw, cast, or otherwise form molten glass from a tank or pot into sheets and to cool and anneal the sheets in ordinary manner. The sheets are then cemented with plaster of Paris, or otherwise secured to tables or cars for grinding. The sand employed in the grinding operation should comprise relatively pure silica, for example it should be a sand of substantially the same composition as is employed conventionally in the preparation of a glass batch. This material is reclassified and reused in the grinding operations until it is reduced to a particle size such that the major portion thereof will pass through a screen of about 325 mesh per inch. Such material will contain from 12 to about 20 or 25 per cent of finely divided glass and one or two per cent of iron, mainly in the form of minute particles abraided from the iron grinding discs or runners. Small amounts of gypsum, the material employed to cement the glass plates to the grinding tables, together with other impurities may also be in the mixture. The slurry of crushed silica, glass and impurities is passed under a magnetic separator where the major portion of the iron is removed, and in order further to separate the iron the mixture may then be treated with hydrochloric or sulphuric acid of approximately 5 or 10 per cent concentration to dissolve residual metallic iron, iron oxides and such like materials. Subsequently, the mixture is filtered and washed in order to remove the soluble iron compounds, alkali salts and such like materials and in order to eliminate as much as possible of the water of the mix.

Assuming that the waste sand contained about 20 per cent of glass at the start of the purification, the purified product will usually contain about 17 per cent of glass. The difference in glass content of the purified and unpurified material is probably represented by free alkalies released from the glass by hydrolysis and neutralized and dissolved by the acids. The particles of glass in the mixture probably comprise nuclei of essentially unmodified glass surrounded by thin outer coatings of silica which probably have been deprived of most, if not all, of the fluxes. A trace (e. g. 0.5 or .2%) of iron may be present, but usually is unobjectionable.

In the manufacture of glass, the sand is normally admixed with a certain amount of broken glass in the form of cullet in order to improve the melting qualities thereof. There is usually enough finely divided glass in the silica from the grinding operations to replace the major portion, if not all of the cullet normally added to the sand. However, if desired additional cullet may be incorporated into the sand to make up any deficiencies.

In the formation of a glass batch from a mixture of crushed silica and glass prepared in accordance with the provisions of the present invention fluxes including lime or its equivalent and alkalies such as sodium carbonate, potassium carbonate, salt cake and other constituents normally employed in a glass batch are added in appropriate amounts. In some cases sodium silicate may be added as a combined flux and bonding agent and replaces a portion of the sodium carbonate. Of course it will be appreciated that the specific composition of the glass batch is conventional and well understood by those skilled in the art. It is also susceptible of relatively wide variation to obtain various products suitable for different purposes.

An example of a glass batch which is included within the purview of the present invention comprises about 64.5 parts of purified sand from the grinding and polishing operations and the remainder a mixture of fluxes. The fluxes may comprise various proportions of alkali earth, metal compounds in admixture with alkali metal compounds. In a specific example it contained 17.5 parts of calcium carbonate, 15.5 parts of soda ash and about 1.8 parts of salt cake, together with minor proportions of various other ingredients, such as cobalt or the like.

In order to form coherent nodules suitable for use in a glass batch, water should be present in an amount which will depend somewhat upon the state of subdivision of the silica. For a material of a fineness such that the major portion will pass a screen of 325 mesh about 20 pounds of water per 100 pounds of batch is satisfactory. For this grade of material the minimum practicable amount of water probably is not much less than 17 per cent, nor greater than 26 per cent. With greater or less percentages, satisfactory agglomeration of the mass cannot be obtained. The water in the mixture may comprise residual water remaining in the mixture of silica and glass after purification, or if preferred the mixture may be partially or completely dried by application of heat or vacuum or a combination of the two, and enough water then added to the mixture at the time of use to provide the requisite consistency. In the latter case, the addition of water may either precede or follow the incorporation of the fluxes with silica and glass debris. Addition to the silica-glass mixture of the fluxes in dissolved state is contemplated.

Preferably the proportion of water is such that substantially saturated solutions of the soluble compounds in the glass batch are formed.

The mixture should not contain more than enough water to form what is termed a "soft mud mix." That is it should be workable by hand, but it should not be sloppy or slip-like. A soft mud is excellently adapted for flaking or mulling to form nodules appropriate for use in a glass batch. The mixture may be in "stiff mud" state in which it can be extruded through dies or screens to form masses suitable for use in a glass batch. A "semi-dry" mass may, also, be prepared and is suitable for pressing into briquettes. Optimum consistency for working into nodular form seems to be between a soft and a stiff mud. The soda ash may be anhydrous or it may contain varying amounts of water up to that required for the formation of the decahydrate. Assuming that the soda ash is partially hydrated the amount of water added to the batch may be reduced a proportional amount. The amount of water should be less than that required completely to dissolve all of the salts.

As previously intimated plaster of Paris may be employed as a combined dehydrating and bonding agent. It can be added as a slurry or paste to the dry batch material or dry plaster of Paris can be incorporated, along with other batch ingredients, into the moist cake of recovered grinding sand. About 5 to 15 pounds of plaster for each hundred pounds of batch constitutes a good range. But these proportions may be varied.

The calcium sulfate will take the place of a portion of the lime and will also supply sulfate radical thus replacing all or a portion of the salt cake usually present in the batch.

Calcium sulfate, in the form of plaster of Paris, is in highly intimate association with the glass, silica and soda ash and therefore readily combined with them to form glass when the batch is heated. The plaster readily sets up to form solid nodules without any drying. The setting may be retarded or accelerated as desired by addition of glue, casein, salts and the like.

Plaster from the grinding tables can readily be recovered and used as the source of calcium sulfate.

One method of introducing water involves heating a relatively dry mixture of the finely divided material and hydrated soda ash or other hydrated material, to liberate water of crystallization as water of solution and then allowing the material to cool. The salts then recrystallize to cause the material to set up. A further variation would involve introducing anhydrous soda ash into moist batch material and heating the material to effect rapid solution of the soda ash. Upon cooling of the material the soda ash would set to bind the water as water of hydration. Prior to setting of the mass it should be nodulated or otherwise formed into units of appropriate dimension for use in a glass batch.

Mixing of the various materials should be thorough. Such mixing may be effectively accomplished by use of a mulling roller preferably assisted by vanes or paddles operating in a revolving bowl. A mixer of the type known as the Lancaster mixer, sold by the Lancaster Iron Works, Lancaster, Pennsylvania, and described in their Bulletin 70–B of 1938 is quite satisfactory for the purpose. As a result of the mixing action the finely divided silica glass and the fluxing agents are thoroughly intermixed, and the mixture becomes agglomerated into nodules of assorted sizes. Probably the average size is approximately ¾ or 1 inch in diameter. The smaller ones are approximately the size of peas. The size of the nodules may be controlled by increasing the time of agitation. The longer the mass is agitated, the larger will be the nodules.

Drying of the mixture may be effected while it is being milled or agitated, or it may be effected by mere exposure to the atmosphere. It may be substantially expedited by passing the material through dryers which may be of the rotary, belt, or any other convenient type. Of course much water may be present in the batch materials as water of crystallization.

As one feature, the invention involves the addition of the soda ash, salt cake, etc. in partially or completely dehydrated state. They will then tend to absorb the free water from the batch to form a dry, but hydrated material which will require little or no drying. Calcium carbonate or its equivalent may be partially or completely replaced by calcium oxide or oxides of other alkaline earths, such as magnesium or barium, which will absorb water to form the corresponding hydrates. Sodium carbonate may also be replaced by compounds such as anhydrous sodium silicate which will tend to take up free water from the mix to form dry, hard agglomerates or nodules. The use of anhydrous calcium chloride, magnesium chloride, anhydrous gypsum or plaster of Paris as combined bonding and dehydrating agents is also feasible. In some cases the regular bonding action of the batch ingredients may be augmented by use of agglutinants, such as molasses or aqueous sodium silicate. It may even be practicable to formulate the batch material in dry state and then to nodulate the mix by adding a relatively dry bonding agent such as tar thereto. In event that carbonaceous substances are employed increase of the amount of salt cake is desirable. This is well understood by those skilled in the art.

The following represent formulae which may be employed to prepare batch material for the manufacture of glass:

*Example I*

| | Pounds |
|---|---|
| Purified waste sand | 2082 |
| $Na_2CO_3$ | 282 |
| $Na_2SO_4$ | 70 |
| CaO | 165 |

*Example II*

| | Pounds |
|---|---|
| Purified waste sand | 1900 |
| $Na_2CO_3$ | 282 |
| $Na_2SO_4$ | 70 |
| CaO | 165 |

*Example III*

| | Pounds |
|---|---|
| Purified waste sand | 1050 |
| $Na_2CO_3$ | 282 |
| $Na_2SO_4$ | 70 |
| $CaCO_3$ | 330 |

In each instance enough water to give a workable mass was employed.

The materials may be melted down in pots or tanks at temperatures of about 2200 or 2300° to form glass which can then be drawn or cast into sheets, annealed, and ground with fresh sand.

The agglomerated masses may be dried to any desired free water content, so long as the water content is sufficiently low that the masses will be non-sticky with respect to each other. If desired, practically all of the water may be removed. However, in most cases such complete removal is not necessary because the water will be driven off in the pots or tanks when the materials are introduced into the latter. About 5 or 6 per cent may be retained if desired.

The nodular masses possess many valuable properties. For example, they are of assorted sizes and therefore the smaller ones tend to pack into the spaces between the larger, thus reducing the volume of material and correspondingly reducing the spaces required for storage. Also the masses are quite strong and withstand handling and long storage without the formation of objectionable dust. It will be apparent that when the glass batch is thus agglomerated all of the materials necessary to formation of glass may be stored in a single bin without any danger of the various constituents tending to classify or separate and thereby producing non-uniformity in the finished glass obtained therefrom.

The nodulated material can be dumped into a glass tank or pot without loss by dusting. Moreover the mass is easily permeated by and becomes distributed in the molten glass. The conduction of the heat through the nodular masses is quite rapid and as a result the latter are quickly melted down at a comparatively low temperature to a fluid state. Doubtless the transformation into fluid glass is greatly promoted by the intimacy of the mixture of the finely divided particles of silica, glass debris and flux. By thus reducing the time required for melting down the glass there is a substantial increase in the capacity of glass tanks and pots and at the same time there is a corresponding saving in the amount of fuel required for the production of a given quantity of glass.

Each nodule is of exactly the same composition as the others, so that upon melting they flow together to form a homogeneous body. Ae a result of the great intimacy and uniformity and mixture of the various constituents in the glass batch it is found that the finished glass product obtained is exceptionally uniform and free of the effects of stratification and non-uniformity which frequently characterizes glass prepared in accordance with conventional procedure.

Although only certain preferred forms of the invention have been shown and described, it will be apparent to those skilled in the art that numerous modifications may be made therein without departure from the spirit of the invention or the scope of the appended claims.

What we claim is:

1. A process of preparing coherent masses of glass batch material containing intimately and uniformly associated mixtures of silica and glass particles bonded together by the alkali and alkali earth metal fluxes of the batch, which process comprises filtering an aqueous slurry of waste sand obtained from the grinding and polishing operations of glass plates, to remove the major portion of the water and obtain a damp mass, said waste sand comprising a mixture of about 10 to 25 per cent of glass, the rest being essentially silica, the glass and silica in the mixture being of a particle size, such that most of it will pass a screen of about 325 mesh, mixing the damp mass with alkali metal and alkali earth metal fluxes, at least some of which fluxes are at least partially anhydrous and are soluble in water, to form a glass batch whereby the soluble fluxes are at least partially dissolved in the residual water of the damp mass, and forming the mixture into bodies of a suitable size for incorporation into a glass batch with the fluxes and water constituting the bonding agents.

2. A process as defined in claim 1 in which the waste sand initially contains about 1 or 2 per cent of iron resulting from the grinding operations, which iron is removed prior to the incorporation of the fluxes by subjecting the slurry of waste sand first to the action of a magnetic separator to take out particles of magnetic iron and then to the action of sulphuric acid of a concentration not exceeding about 10 per cent to dissolve residual iron and iron compounds and subsequently washing out the soluble iron salts and filtering off excess wash water, a portion of the water being retained and constituting the residual water for dissolving the soluble fluxes.

3. A process of preparing coherent masses of glass batch material containing intimately and uniformly associated mixtures of silica and glass particles bonded together by the alkali and alkali earth metal fluxes of the batch, which process comprises filtering the water from a slurry of waste sand from the grinding and polishing of glass plates with a suspension of sand in water, to remove the major portion of the water and obtain a damp mass consisting of about 17 to 25 per cent water, 10 to 25 per cent of glass and the rest being essentially silica, the glass and silica being of a particle size, such that most of it will pass a screen of about 325 mesh, the process further comprising incorporating the partially dried mass with solid alkali metal and alkali earth metal fluxes of the glass batch at least some of which fluxes are soluble in water and then forming the mixture in nodular bodies of a size suitable for incorporation into a glass batch by mulling the mixture.

4. A process as defined in claim 1 in which the masses are subsequently dried.

5. A process as defined in claim 1 in which the fluxes are initially anhydrous and the free water and waste sand is at least in part taken up as water of crystallization in the fluxes.

6. A process of preparing nodular glass batch material which comprises grinding the surfaces of glass plates with a slurry of sand and water as an abrasive to obtain an intimate mixture of silica and glass of a particle size such as to pass a screen of about 325 mesh, filtering the aqueous slurry of waste sand to remove the major portion of the water and obtain a damp mass, incorporating alkali metal and alkali earth metal fluxes requisite to form a glass batch with the resultant waste sand, at least some of which fluxes are soluble in water to dissolve in the residual water and then mulling the mass in order to form nodules.

7. A process of preparing coherent masses of glass batch material containing intimately and uniformly associated mixtures of silica and glass particles bonded together by the alkali and alkali earth metal fluxes of the batch, which process comprises filtering an aqueous slurry of waste sand obtained from the grinding and polishing operations of glass plates, to remove the major portion of the water and obtain a damp mass, said waste sand comprising a mixture of about 10 to 25 per cent of glass, the rest being essentially silica, the glass and silica in the mixture being of a particle size, such that most of it will pass a screen of about 325 mesh, mixing the damp mass with alkali metal and alkali earth metal fluxes, at least some of which fluxes are soluble in water, to form a glass batch whereby the soluble fluxes are at least partially dissolved in the residual water of the damp mass, and forming the mixture into bodies of a suitable size for incorporation into a glass batch with the fluxes and water constituting the bonding agents.

GEORGE J. BAIR.
ROBERT A. MILLER.